US007997969B1

(12) United States Patent \
Murrell et al.

(10) Patent No.: US 7,997,969 B1 \
(45) Date of Patent: Aug. 16, 2011

(54) SYSTEM AND METHOD FOR IMPLEMENTING A GAME FOR FINANCIAL DATA EXTRACTION

(75) Inventors: Martin Murrell, Washington, DC (US); Melissa Ehresman, Midlothian, VA (US); Mina Buenviaje-Tice, Glen Allen, VA (US); Michael Armstrong, Glen Allen, VA (US)

(73) Assignee: Capital One Financial Corp, McLean, VA (US)

( * ) Notice: Subject to any disclaimer, the term of this patent is extended or adjusted under 35 U.S.C. 154(b) by 640 days.

(21) Appl. No.: 11/686,477

(22) Filed: Mar. 15, 2007

(51) Int. Cl. \
*A63F 9/24* (2006.01)

(52) U.S. Cl. ............ 463/9; 705/14.49; 705/35

(58) Field of Classification Search ............ 463/9, 25; 273/256, 278; 434/107; 705/35, 36 R \
See application file for complete search history.

(56) References Cited

U.S. PATENT DOCUMENTS

| | | | |
|---|---|---|---|
| 6,612,932 B2 * | 9/2003 | Stern | 463/42 |
| 6,709,330 B1 * | 3/2004 | Klein et al. | 463/9 |
| 6,979,267 B2 * | 12/2005 | Leen et al. | 463/42 |
| 7,029,394 B2 * | 4/2006 | Leen et al. | 463/16 |
| 7,040,982 B1 * | 5/2006 | Jarvis et al. | 463/9 |
| 7,136,617 B2 * | 11/2006 | Libby | 434/350 |
| 2002/0142815 A1 | 10/2002 | Candelore | |
| 2003/0050115 A1 | 3/2003 | Leen et al. | |
| 2003/0054884 A1 | 3/2003 | Stern | |
| 2004/0225553 A1 | 11/2004 | Broady et al. | |
| 2005/0143166 A1 * | 6/2005 | Walker et al. | 463/25 |
| 2006/0025216 A1 * | 2/2006 | Smith | 463/35 |
| 2006/0121991 A1 | 6/2006 | Borinik et al. | |
| 2006/0178217 A1 * | 8/2006 | Jung et al. | 463/42 |
| 2006/0205489 A1 | 9/2006 | Carpenter et al. | |
| 2006/0247039 A1 | 11/2006 | Lerner et al. | |
| 2007/0026945 A1 * | 2/2007 | Nguyen | 463/42 |
| 2008/0275824 A1 * | 11/2008 | Assia et al. | 705/36 R |

OTHER PUBLICATIONS

Bandini, Stefania, et al., "A Multi-agent System for Remote Psychological Profiling With Role Playing Games Based Tests", Proceedings of the 2003 ACM Symposium on Applied Computing, Melbourne, FL., pp. 33-37, 2003.

* cited by examiner

*Primary Examiner* — Dmitry Suhol \
*Assistant Examiner* — Jay Trent Liddle \
(74) *Attorney, Agent, or Firm* — Hunton & Williams LLP

(57) ABSTRACT

A system and method of implementing a financial data extraction process including receiving information associated with a user, providing the user a game to play, the game being associated with a financial service environment, acquiring one or more responses from the user during game play, and determining one or more characteristics associated with the user based on the one or more responses acquired from the user during game play.

22 Claims, 5 Drawing Sheets

SYSTEM AND METHOD FOR IMPLEMENTING A GAME FOR FINANCIAL DATA EXTRACTION

FIELD OF THE INVENTION

The present invention relates to a system and method for conducting a financial survey and extracting data from a user through a game.

BACKGROUND OF THE INVENTION

Obtaining and maintaining customers is critical to every company. One way a company may develop new customers while retaining the old customers is to have in-depth knowledge about its customers. Customer surveys provide a way to elicit information from customers. However, some disadvantages associated with conventional methods of conducting a customer survey are that customers may be hesitant to provide personal information, or the customer may provide inaccurate information. Also, a survey may take a long time to be completed. Customers may think the surveys are tedious and time consuming and thus may lack the motivation to carefully and accurately fill out the survey. Thus rendering the information gathered inaccurate and/or useless. These and other drawbacks exist.

SUMMARY OF THE INVENTION

Accordingly, various embodiments of the present invention directed to a system and method for conducting a financial data extraction game may be provided. A system may include an authentication module which may receive information associated with a user. The authentication module may also authenticate a user into a financial service environment. A game engine module may provide a user a game to play in the financial service environment and may also acquire one or more responses associated with the user during game play. A game engine module may transfer acquired one or more response associated with the user to a game data module. The game database module may receive and/or store one or more responses acquired during game play in the financial service environment. Further, an analysis module may be provided to determine one or more characteristics associated with the user based on the one or more acquired responses.

Various embodiments of the present invention may also be directed to a method for conducting a financial survey utilizing a game may be provided. A method may include receive user information, identify a user, and authenticate the user into a financial service environment. A game for data extraction may be provided to the user in the financial service environment. Actions, responses and/or feedback provided by a user to different scenarios presented within a game may be acquired, and the user's actions, responses and/or feedback may be stored. User characteristics and preferences associated with a user actions, responses and/or feedback acquired during the game in the financial service environment may be determined and analyzed.

Various exemplary embodiments of the present invention may also be directed to a computer-accessible medium encoded with computer program code for offering a financial survey utilizing a game. The computer program code may enable receive information associated with a user and authenticate the user into a financial service environment. Also, provide the user a game to play and acquire one or more responses associated with the user during game play. Transfer and store the one or more responses acquired during game play in the financial service environment in a database. Further, the computer-accessible medium encoded with computer program code may also enables determination one or more characteristics associated with the user based on the one or more acquired responses.

Various exemplary embodiments may enable a user to access the financial service environment by providing user identification information to the financial service environment. Also, a user may access the financial service environment directly from a link on a webpage associated with a financial institution. Further, a user may be prompted to provide user information to create a temporary account with a financial institution to access a financial service environment. A user may also obtain a pre-approved account or password to access a financial service environment associated with a financial institution.

In various exemplary embodiments, a user may be provided with different options within a financial service environment. A user in a financial service environment may be able to form a user community and may enable multiple players to play a game within the financial service environment. Also in a user community, users may be able to compete against each other or may form a team to achieve an objective. Further, a user community may also enable users to play together via a network or by gathering around a single system to play. A user community may also enable communication between users for the duration of the game.

In various exemplary embodiments, users may be provided access to a forum in a financial service environment. A forum may include, without limitation, rankings of players, top scores for a game along with user name, any postings by users to communicate with each other, and any strategies recommended by a financial institution.

Various exemplary embodiments may provide a reward system for users who may play a financial data extraction game. A reward system may provide a user of a game with reward points which may be associated with products and/or services offered by a financial institution. Reward points may be earned by a user for a wide variety of reasons. Also, reward points may be offered to users who join and/or play the financial data extraction game.

Various exemplary embodiments may provide a financial data extraction game associated with different genres. The different genres of the financial data extraction game may include, without limitation, adventure, casual, fighting, platform, puzzle, racing, role-playing, simulation, sports, strategy game, and shooters. In an exemplary embodiment, the different genres of games may enable a user to play financially-centric games. The user may be presented with different scenarios and questions, financial choices, needs, emotions, preferences and other characteristics of the user may be revealed. Actions, responses and/or feedback provided by a user may be captured and stored in a financial data extraction system associated with a financial institution.

In various exemplary embodiments, data associated with a financial data extraction game may be stored in a storage system and may be mined and analyzed to enable a financial institution to provide products and/or services to a user. Actions, responses and/or feedback acquired during a financial data extraction game may be used in a variety of ways including, without limitation, to identify how a user may want to be served, to determine potential products and/or service that a user may be of interest to, map and identify a user's personal analysis and educational information required by the user.

Other embodiments may also be considered.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which.

DETAILED DESCRIPTION

Figure 1:
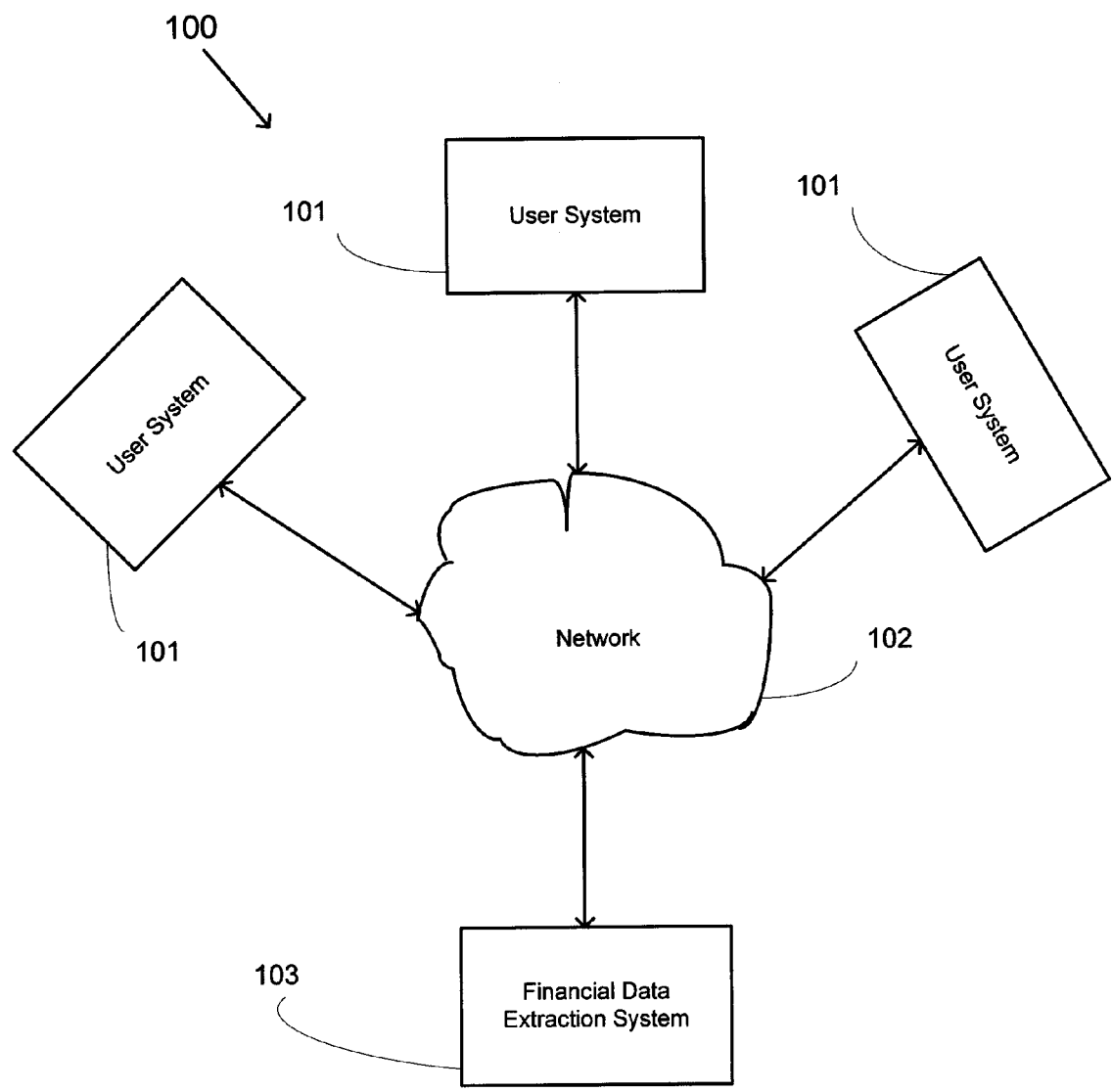
FIG. 1 depicts a system to extract user data utilizing a financial game according to an exemplary embodiment of the disclosure.

The following description is intended to convey a thorough understanding of the embodiments described by providing a number of specific embodiments and details involving systems and methods for implementing a game for financial data extraction. It should be appreciated, however, that the present invention is not limited to these specific embodiments and details, which are exemplary only. It is further understood that one possessing ordinary skill in the art would appreciate the use of the invention for its intended purposes and benefits in any number of alternative embodiments, depending on specific design and other needs.

According to various embodiments of the present invention, a financial data extraction game system may enable a financial institution to acquire user data via the user's actions, responses and/or feedback provided while playing a game associated with the financial institution. In various exemplary embodiments, a user may refer to an existing or potential customer of a financial institution. A financial institution may refer to an entity that offers financial products and/or services to users and/or customers. A financial service environment may refer to an environment created or authorized in association with a financial institution and the financial service environment may be real or virtual. A financial data extraction game may refer to a game associated with a financial institution. In various exemplary embodiments, a financial data extraction game may extract data and/or information associated with a user during game play.

In various exemplary embodiments, a financial data extraction system may be administered by a financial institution via the Internet or a mobile storage device associated with a financial institution and/or user system. A mobile storage device associated with a financial institution and/or user system may include, without limitation, paper card storage, punched card, tape storage, paper tape, magnetic tape, disk storage, gramophone record, floppy disk, hard disk, ZIP disk, holographic, molecular memory. A mobile storage device associated with a financial institution and/or user system may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual storage device. A mobile storage device associated with a financial institution and/or user system may further include, without limitation, magnetic bubble memory, magnetic drum, core memory, core rope memory, thin film memory, twistor memory, flash memory, memory card, semiconductor memory, solid state semiconductor memory or any other like mobile storage devices.

In an exemplary embodiment, where a financial data extraction system may be administered via the Internet, a user may access the financial data extraction system via a webpage associated with a financial institution. The webpage associated with a financial institution may contain a tool bar, a drop down menu, a pop-up window, or as an icon or other graphical representation that may be associated with the initiation of the financial data extraction game. In such an embodiment, the webpage associated with the financial institution may be presented to a user on a display of a user system associated with the user. A user may activate a financial data extraction game by clicking on a graphical representation associated with the initiation of the financial data game, for example.

Also, a financial data extraction game may be administered by a mobile storage device associated with a financial institution. A user may initiate the administering of a financial data extraction game by installing the financial data extraction game on a storage device associated with a user system.

In an exemplary embodiment, the financial data extraction game may be installed on a storage device associated with a user system and a connection (e.g., a remote connection) may be established with a financial data extraction system to enable communication of user actions, responses and/or feedback to the financial data extraction system. During game play or each subsequent access the installed financial data extraction game may reestablish connection to enable transfer of captured user actions, responses and/or feedback to the financial data extraction system. A user may activate the financial data extraction game installed on a storage device associated with a user system by, for example, clicking on an icon, a link, or other graphical representation for the financial data extraction game associated with the user system or any other like manner.

FIG. 1 depicts an exemplary embodiment of a system 100 to enable a financial data extraction game. System 100 may include a plurality of user systems 101, a network 102, and a financial data extraction system 103. As shown in FIG. 1, user system 101 may be coupled to financial data extraction system 103 via network 102. A user may operate user system 101 to transmit and receive information to and from financial data extraction system 103 via network 102. In an exemplary embodiment, user system 101 may contain an interface to transmit and receive information to and from financial data extraction system 103 via network 112. User system 101 may include, without limitation, any computer device, or communications device including, e.g., a personal computer (PC), a workstation, a mobile device, a phone, a handheld PC, a personal digital assistant (PDA), a thin system, a fat system, a network appliance, an Internet browser, a paging, an alert device, a television, an interactive television, a receiver, a tuner, a high definition (HD) television, a HD receiver, a video-on-demand (VOD) system, a server, or other device.

A plurality of types of interfaces may be supported by user system 101 to transmit and receive information to and from financial data extraction system 103. In an exemplary embodiment, where network 102 may be the Internet, the interface may be used by user system 101 to interact with financial data extraction system 103 may include, without limitation, a web browser, such as INTERNET EXPLORER, NAVIGATOR, or FIREFOX web browser programs, offered by Microsoft Corporation of Redmond, Wash., Time Warner of New York, N.Y., and the Mozilla Foundation of Mountain View, Calif., respectively. User system 101 may also include one or more web browser programs that may enable a user to view content delivered via the Internet. The aforementioned web browser programs may include HTTP browsers, as well as Wireless Application Protocol (WAP) browsers, or any other suitable browser based on various Internet protocols.

Network 102 may include, without limitation, a wide area network (WAN), a local area network (LAN), a global network such as the Internet, a telephone network such as a public switch telephone network, a wireless communication network, a cellular network, an Intranet, or the like, or any combination thereof. In an exemplary embodiments, network 102 may include one, or any number of the exemplary types of networks mentioned above operating as a stand-alone network or in cooperation with each other. Use of the term network herein is not intended to limit the network to a single network.

Figure 2:
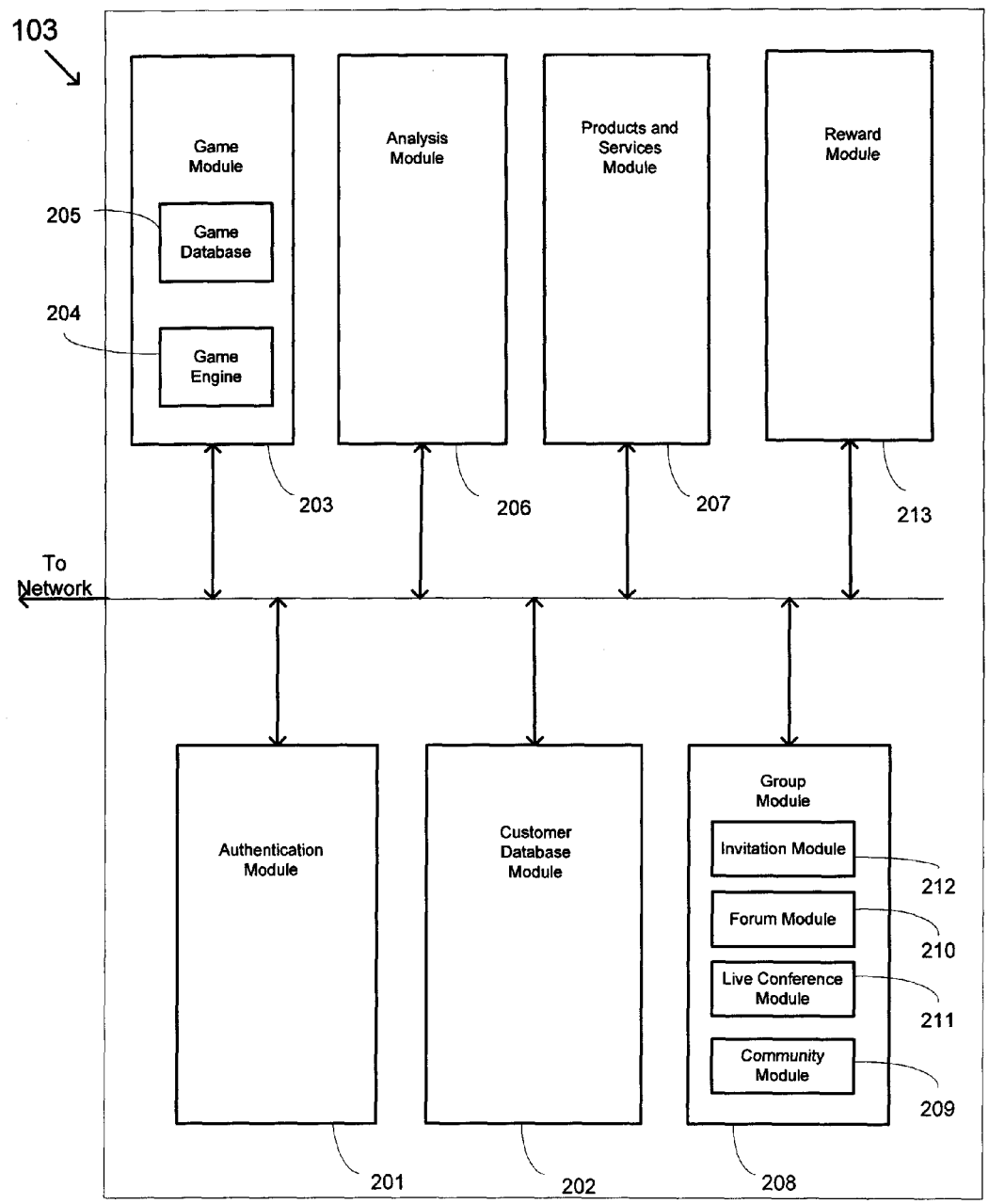
FIG. 2 depicts a system to extract user data utilizing a financial game according to an exemplary embodiment of the disclosure.

FIG. 2 depicts an exemplary embodiment of a financial data extraction system 103 that may enable a financial data extraction game, for example. Modules of financial data extraction system 103 may be part of a single system as shown in FIG. 2, or the modules may be part of separate systems either physically or logically separated, wherein each module performs a predetermined function. As shown in FIG. 2, financial data extraction system 103 may include an authentication module 201, which may receive user identification information associated with a financial institution via a network (e.g., network 102).

To establish an association with a financial institution, a user may apply for and receive an account associated with products and/or services offered by a financial institution (e.g., credit card, loans, mutual funds, or any other aforementioned financial products and/or services). The financial account may be managed by the user via the Internet, telephone, mail, facsimile, in person or in any other manner for managing an account. The financial account may be designated with numbers or letters, and may optionally also contain an encoded number for security or any other information. During the application process and/or afterwards, the user may provide or establish a user identity with a financial institution.

In various exemplary embodiments, a user identity may include, without limitation, information associated with a user's name, address, home telephone number, cellular telephone number, e-mail address, a username and password combination, biometric information associated with the user and/or other information to identify the user. The biometric information may include, for example, data associated with the user's hand, fingertips, voice, iris, retina, face, signature, gait, or any other suitably unique characteristic of the user. The user identification information associated with the financial account may be used by the financial data extraction system to identify and/or authenticate a user.

An established user identity associated with a financial account of a financial institution may be stored in a customer database module 202. Authentication module 201 may compare user identification information provided by a user and an established user identity associated with a financial account of a financial institution stored in customer database module 202. The user identification information provided by a user may match the established user identity associated with a financial account of a financial institution stored in customer database module 202 and the user may be allowed access to a financial service environment. Authentication module 201 may also identify information associated with a user stored in customer database module 202.

In an exemplary embodiment, customer database module 202 may be any storage device including, without limitation, paper card storage, punched card, tape storage, paper tape, magnetic tape, disk storage, gramophone record, floppy disk, hard disk, ZIP disk, holographic, molecular memory. Customer database module 202 may also include, without limitation, optical disc, CD-ROM, CD-R, CD-RW, DVD, DVD-R, DVD-RW, DVD+R, DVD+RW, DVD-RAM, Blu-ray, Minidisc, HVD and Phase-change Dual. Customer database module 202 may further include, without limitation, magnetic bubble memory, magnetic drum, core memory, core rope memory, thin film memory, twistor memory, flash memory, memory card, semiconductor memory, solid state semiconductor memory or any other similar types of storage device.

Also, customer database module 202 may store any information associated with a user and may enable other modules in financial data extraction system 103 to obtain information associated with a user from customer database module 202. For example, customer database module 202 may also store information associated with a user's established identity as mentioned above. Also, customer database module 202 may store a plurality of user's related account information in a database. The user's account information may include, without limitation, account identification information (e.g., an account number and/or any other information associated with an established user identity), billing address, payment information, existing financial products and/or services associated with the user and any other information that may be associate with a user account.

A user may be authenticated into a financial service environment module 201 and a financial data extraction game may be presented to the user by a game module 203. Game module 203 may include, for example, a game engine module 204 and a game database module 205. The information associated with a user transferred by authentication module 201 may be temporarily stored in game engine module 204. Game engine module 204 may simultaneously, and/or upon receiving information associated with a user, present the user a menu of financial data extraction games. A user may select a financial data extraction game and game engine module 204 may access game database module 205 where different genres of financial data extraction games may be stored.

In an exemplary embodiment, a financial data extraction game may enable a user to play one or more financially-centric games and the user may be presented with different scenarios and questions. For example, a scenario may present a user with a sum of money and the user may pay off existing debt or purchase a new item. The user's decision to pay off existing debt or purchase a new item for example, may be analyzed as information to enable a financial institution to determine the creditworthiness of the user.

Also, where a user may select an adventure financial data extraction game the user may be presented with an exploration scenario. The user may select different characters associated with the exploration scenario which may have different personalities. Game engine module 204 may capture the selected personalities and/or characteristics and associate and/or relate the selected personalities and/or characteristics to those of the user. The personalities and/or characteristics of the user may be analyzed to determine how the user may want to be served by the financial institution.

A user may also select a causal financial data extraction game, where a scenario may have few rules and be easy for user to play in a limited amount of time. Game engine module 204 may capture the characteristics of a user who may select a causal financial data extraction game, where the user may not have much time and/or patience and may lead a fast pace life. Thus, the user's selection of playing the casual game may be associated with characteristics of a fast paced life and/or lack of patience may be analyzed to determine the type of financial services to help the user to manage its assets.

Further, a user may select a fighting financial data extraction game, where a user may compete with other users and/or may enable users to compete as teams. A user/team may be presented with a close combat scenario associated with a fight financial data extraction game for example, and the competitiveness of the user/team may be demonstrated. The competitiveness of a user/team may be analyzed to determine whether to offer the user multiple financial products and/or services.

Furthermore, a user may select a platform financial data extraction game, where the user may be presented with a path of jumping to and from suspended platforms and/or over obstacles or a safe alternative path. A user may select between the risky path and/or the safer path, for example. The user's selection of a risky path or a safe path may be analyzed to determine the risk tolerance of the user. The financial institution may offer financial products and/or services to the user according to the risk tolerance of the user.

Also, in various exemplary embodiments, a user may select a puzzle financial data extraction game, where the user may complete a process of inquiry and discovery to complete the puzzle. A puzzle financial data extraction game may measure a user's attention and/or inductive reasoning skills. The user's attention and/or inductive reasoning skills may be construed to determine the user's ability to comprehend complex investment strategies offered by a financial institution.

Also, a user may select a racing financial data extraction game, where the user may be presented with a vehicle racing to complete a number of circuits in the shortest amount of time. A user may also compete with other users (e.g., in a user community) of the racing financial data extraction game and users may have control of the vehicle associated with a racing financial data extraction game. Thus, the user's ability to control and manage may be analyzed to demonstrate the ability of the user to repay a loan. Further, a user's driving pattern may be analyzed to determine the risk tolerance of the user.

Further, a user may select a role-playing financial data extraction game where the user may assume the role of a fictional character and collaboratively create a story. A user may shape and/or direct the outcome of a financial data extraction game. Thus, the user's interactivities and imaginations may be analyzed to determine the user's acceptance to a new and/or creative financial products and/or services.

Furthermore, a user may select a simulation financial data extraction game, where a user may be presented with a scenario that may contain a mixture of skill, chance and/or strategy to simulate an aspect of reality, for example a stock exchange. The buying and selling pattern of a user during play of a stock exchange simulation financial data extraction game may be captured by game engine module 204. The buying and selling pattern may be analyzed to determine the types of securities the user may invest in.

A user may also select a sports financial data extraction game where the user may be presented with a sports game which may contain strategy, control and/or management of a sports team. The user's selection of strategy and control of a sports game may be fast-paced and high-scoring or steady and low-scoring. The user's selection of fast-paced and high-scoring or steady and low-scoring may be analyzed to determine short-term or long-term investment may be offered to the user. Above mentioned exemplary embodiments of a financial data extraction games according to the disclosure may further include, without limitation, any games that may be utilized as a financial data extraction game. Also, disclosure of the above mentioned exemplary financial data extraction games and the exemplary information analyzed therefrom is not intended to be limiting in any manner. For example, additional or different information may be analyzed in association with the above exemplary games.

Any actions, responses and/or feedback from a user during a financial data extraction games may be captured by game engine module 204. Game engine module 204 may associate the information associated with a user temporarily stored in game engine module 204 and user actions, responses and/or feedback from the user captured during a financial data extraction game. Game engine module 204 may transfer and store the user actions, responses and/or feedback from the user captured during play of a financial data extraction game and related information associated with a user to game database module 205.

Game engine module 204 may include software or hardware or the combination of software and hardware to present a financial data extraction game to a user and/or associate the information associated with a user with the user's actions, responses and/or feedback from the user captured during play of the financial data extraction game. Hardware for game engine module 204 may include, without limitation, a arithmetic and logic unit (ALU), a control unit, a memory and an input and output devices (collectively termed I/O). Software for game engine module 204 may include, without limitation, UNIX System V, AIX, HP-UX, Solaris (SunOS), FreeBSD, NetBSD, IRIX, GNU/Linux, DOS/360, QDOS, PC-DOS, MS-DOS, FreeDOS, Mac OS classic, Mac OS X, Window 9x, Windows NT, Windows CE and Windows XP. Also, software for game engine module 204 may include any algorithms present the game to the user and to associate the information associated with the user with the user's actions, responses and/or feedback from the user captured during a financial data extraction game.

Game database module 205 may include software or hardware or the combination of software and hardware to store one or plurality of genres of a financial data extraction game and/or actions, responses and/or feedback associated with a user. Hardware for game database module 205 may include, without limitation, an arithmetic and logic unit (ALU), a control unit, a memory and an input and output devices (collectively termed I/O). Software for game database module 205 may include any algorithms to transfer, receive and store information to and from other modules in financial data extraction system.

Game database module 205 may transfer actions, responses and/or feedback associated with a user captured during a financial data extraction game and related information associated with the user to an analysis module 206. Analysis module 206 may determine a user's characteristics, a user's preferences and/or any products or services offered by a financial institution that may be suited for the user based on the actions, responses and feedback associated with a user captured during a financial data extraction game.

In an exemplary embodiment, a scenario associated with a financial data extraction game may be utilized to determine information associated with a user's financial profile including, without limitation, risk tolerance, patience, aggressiveness, competitiveness, life-style and any other information that may be utilized by a financial institution in evaluating a user's financial profile. A numerical range may be associated with a user's financial profile. For example, regarding the user's risk tolerance, numeral one may be associated with low risk tolerance and numeral ten may be associated with high risk tolerance. Accordingly, depending on a user's decision within a scenario associated with a financial data extraction game, the decision made by a user may be assigned a corresponding numerical value. Analysis module 206 may tabulate a user's characteristics and/or preferences based on the numerical values assigned to a user's financial profile.

In an exemplary embodiment, a financial institution may utilize a user's financial profile to identify potential products and/or services offered by a financial institution that may be suited for a user. Analysis module 206 may search potential products and/or services that may be suited for a user stored in a products and services module 207 based on the user's financial profile.

The search associated with analysis module 206 may include, without limitation, a Boolean search, list search, linear search, binary search, interpolation search, hash tables, self-balancing binary search tree, tree search, breadth-first search, depth-first search, iterative-deepening search, depth-limited search, bidirectional search, uniform-cost search, SQL search, graph search.

The products and/or services stored in products and services module 207 may represent an offering of products and or services that may be available to users and/or customers of a financial institution. Products and services module 207 may also store any other information associated with a products and/or services (e.g., terms and conditions) offered by a financial institution and may enable access by other modules of financial data extraction system 103. For example, products and services module 207 may store names, terms, conditions, and/or any other like information associated with products (mutual fund, hedge fund, and any other securities options) and/or services (financial advisor, auditing, forecast, strategy advisor or any other services provided by a financial institution) in which a product and/or service may be found, a description and/or images associated with products and/or services, algorithms of implementing a financial products and/or services and/or telephone number or electronic mail address where further upgrade into a products and/or services offered by a financial institution may be sent.

An exemplary analysis module 206 as depicted in FIG. 2 may include, without limitation, software, hardware or a combination of software and hardware operable to determine a user's financial profile, and/or search and associate the user's financial profile with products and/or services offered by a financial institution. Software for analysis module 206 may include, without limitation, algorithms determining a user's financial profile and/or search in a products and/or services system 207. Hardware for analysis module 206 may include, without limitation, a processor or any other like integrated circuit. Analysis module 206 may also cooperate with authentication module 201, customer database module 202, game module 203, game engine module 204, and/or game database module 205 to authenticate and identify a user, to determine a user's financial profile and any products or services offered by a financial institution that may be suited for the user.

A financial data extraction system 103 as shown in FIG. 2 may include a group module 208. Group module 208 may enable users of a financial data extraction game to form a community. A community may include one or more users who play a financial data extraction game. For example, a community may be formed based on users who may be associated with the same financial products and/or services offered by the financial institution. A user may join a community by broad acceptance or by conditional entry. For example, an existing user of a community may invite a new user who may have similar financial profile as the existing user to join the community. Members of a community may have meetings online to discuss a variety of topics for example, to discuss and exchange ideas to improve users financial condition. A community may associated with a forum to enable users to post tactics, top scorer of a financial data extraction game, and a variety of topic postings.

In an exemplary embodiment, a user may be authenticated by authentication module 201 to obtain access to a financial service environment and the user may directly access group module 208. Group module 208 for example, may include a community module 209 which may enable a user to create a community within a financial service environment. A community may be associated for example, with a user, a financial data extraction game, a common goal or objective, a common financial products and/or services, a common interest and/or any combination thereof. Community module 209 may also enable users within a financial data extraction game to form communities or teams to compete against each other. Community module 209 may also access a forum module 210 to create a forum for posting of communications between users within the community.

Forum module 210 may enable users to post and/or share strategies and any communication with other users in a financial service environment. In an exemplary embodiment, forum module 210 may be monitored by a financial institution in order to ensure that any offensive or obscene material is not posted in a forum created by a user using forum module 210 and further may gather more detailed information regarding a user. Also, the financial institution may analyze user communication to determine a user's financial profile.

Group module 208 depicted in FIG. 2 may further include a live conference module 211. Live conference module 211 may provide users of a financial data extraction game instant communication between each other during play of the financial data extraction game. For example, instant communication may include, without limitation, instant messaging, live audio communication and/or live video communication between users during play of a financial data extraction game.

As noted above, a user may join a community by broad acceptance, conditional acceptance or in any other like manner. A creator or an administrator of a community may determine the manner by which a user may join the gaming community. An invitation module 212 may enable a user of a community to invite a user who does not belong to the community to join the community. Invitation module 212 may also enable a user with an established association with a financial institution to invite a user who may not have an established association with a financial institution to join to play a financial data extraction game.

A reward module 213 may be provided to engender incentive for a user to play a financial data extraction game. Reward module 213 may contain a reward account associated with each user and information associated with one or more methods of earning reward points that may be available from a financial institution. For example, a user may achieve a level or score in a financial data extraction game that may qualify the user for reward points. Game engine module 204 may access reward module 213 to obtain any related reward information associated with achieving a level or score in a financial data extraction game and may update the reward information associated with the user's reward account. Also for example, an existing user of a financial data extraction game may invite a new user to play the financial data extraction game which may be enabled by invitation module 212. Invitation module 212 may access reward module 213 to provide and/or obtain any related reward information associated with inviting a new user to join a financial data extraction game and may update the reward information associated with the user's reward account. Further, when one or more users compete in a financial data extraction game, the winner of a competing financial data extraction game may receive reward points.

Game engine module 204 may access reward module 213 to provide and/or obtain any related reward information associated with winning a financial data extraction game and may update the reward information associated with the user's reward account. Other methods of earning reward points of a financial data extraction game may be associated with, the time spent playing a financial data extraction game, an advancement of levels in a financial extraction game, being a winner in a competing financial data extraction game, the number of different financial data extraction games played by a user, being a top scorer for a financial data extraction game and/or inviting player who may not have established association with a financial institution to join a financial data extraction game.

In an exemplary embodiment, reward information and any reward points that may be earned by a user during a financial data extraction game may be stored in a user's reward account in a database associated with reward module 213. A user may review the reward account associated with the user once authenticated into a financial service environment. Also, reward module 213 may include, without limitation, a description and a picture of a reward, reward points corresponding to a category of reward, and the number of reward points required to obtain a discount on products and/or services offered by a financial institution.

Reward module 213, may enable a user to redeem any reward points earned for products and/or services offered by a financial institution, any gifts offered by a financial institution and/or cash back. Reward module 213 may store information associated with redemption of reward points, for example, the amount of reward points needed to qualify for a discount on products and/or services offered by a financial institution, any gifts offered by a financial institution and/or cash back.

Figure 3:
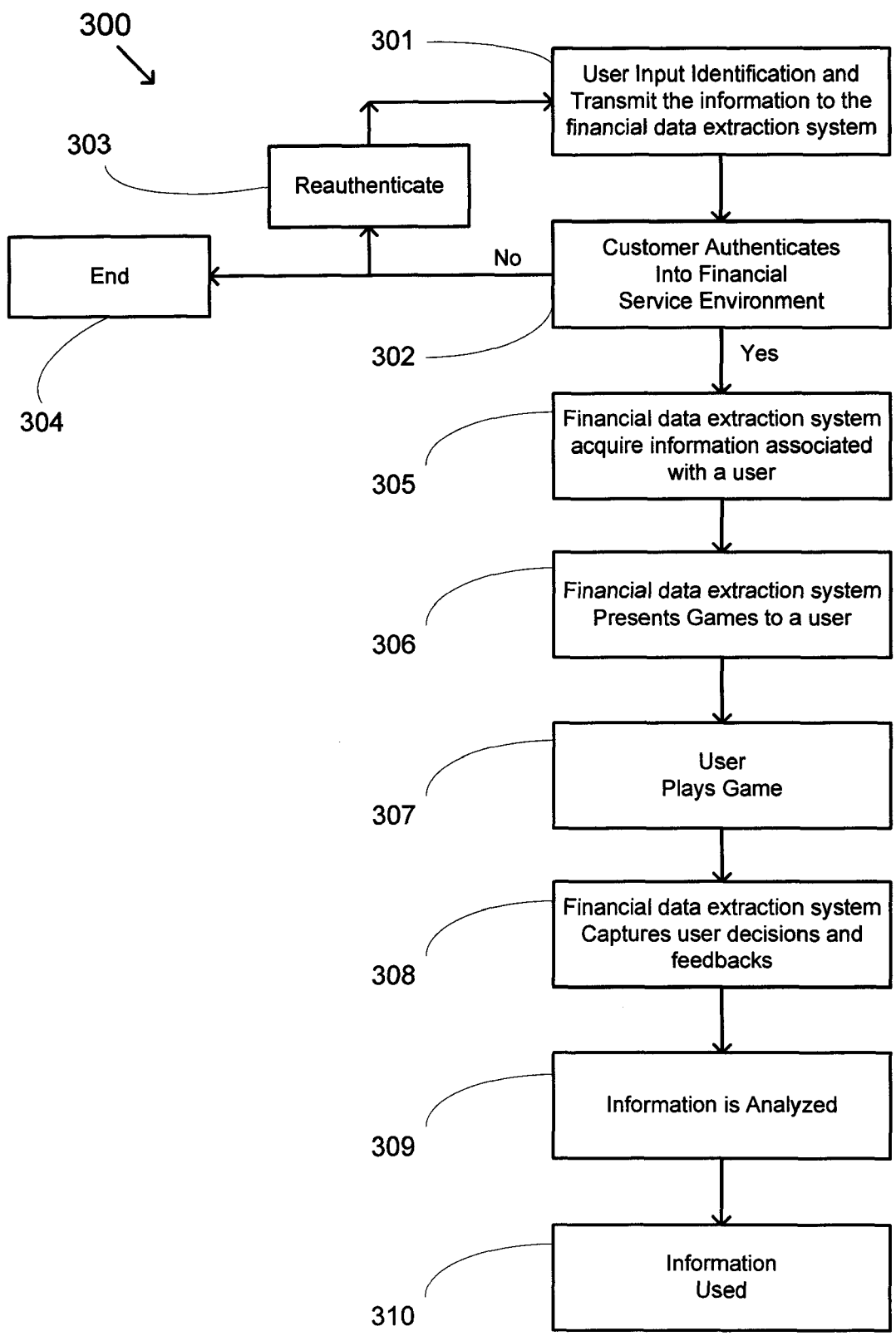
FIG. 3 depicts a flow chart illustrating a method for user data extraction according to an exemplary embodiment of the disclosure.

FIG. 3 depicts a flow chart 300 which illustrates an exemplary method of extracting financial data from a user. In block 301, a user may gain access to a financial data extraction system (e.g., financial data extraction system 103) by transmitting user identification information to the financial data extraction system. The user identification information may be inputted into a user system (e.g., user system 101) utilizing an interface associated with the user system. Examples of inputting user identification information may include, without limitation, manual input (e.g., typing into a keyboard or keypad), voice input, finger printing, retina scan and/or any other method may enable a user to input identification information.

The user identification information may be securely transmitted over a network (e.g., network 102) to the financial data extraction system. During the transfer of user identification information via the network, the user identification information may be encrypted, ciphertext and decrypted according to any security protocols to protect the confidentiality of user identification information during the transmission via the network.

In block 302, user identification information may be received and an authentication module (e.g., authentication module 201) may attempt to authenticate a user using the user identification information. In an exemplary embodiment, user identification information received may be encrypted ciphertext and decrypted according to any security protocols. The user identification information may be processed to decipher or decrypt the user identification information before authenticating the user. The user identification information may be associated with established user identity stored in a customer database module (e.g., customer database module 202). If the user identification information matches an established user identity stored in the customer database module, the user may be provided access to the financial data extraction system.

In some instances, user identification information inputted by a user may not match an established user identity stored in the customer database module, the user may not be allowed to proceed in a financial service environment. The authentication process as described in block 302 may fail, and a user may be notified of the failure and may be asked to reenter user identification information in block 303. A user may reenter user identification information and blocks 301 and 302 may be repeated as explained above in an attempt to re-authenticate.

The authentication module may also limit the number of times a user may try to authenticate into a financial service environment. Also, the authentication module may enable a user unlimited number of tries to authenticate into a financial service environment, until either the user authenticates into the financial service environment or the user stops attempting. In block 304, if a user cannot authenticate, or if the user exceeds the number of attempts permitted to authenticate, the financial data extraction process may end.

In block 305, a search may be performed to identify any information associated with a user. A user may browse user information to verify and/or correct the user information. The user may update any changes associated with the financial account, and the updated user information may be transmitted to the customer database module and stored. For example, a user may change information associated with a financial account for example, without limitation, use's name, password, billing address, payment method and any other information associated with a financial account.

In an exemplary embodiment, a financial data extraction process may not be limited to a user who may established user identity and/or an association with a financial institution. A user who may not have an association with a financial institution may input user identification information via the user system. The financial data extraction system may receive a user's identification information and a temporary account associated with a financial institution may be created in the customer database module. The user's temporary account associated with a financial institution may transfer any information associated with a user to the authentication module. The information required by a new user may include, without limitation, user's name, password, address, telephone number, cellular telephone number, and e-mail address and any other information may be required by a financial institution to gain access to the financial data extraction game.

Also, a new user who may not have established a financial account and user identification information associated with a financial institution, may access a financial data extraction game directly from a link or a connection provided on a webpage associated with the financial institution.

In block 306, a selection of financial data extraction games may be presented to a user simultaneously or upon receipt of information associated with the user. For example, different genres of financial data extraction games may be presented to a user which may correspond to different types of financial data extraction. The information associated with a user may be temporarily stored in a database.

In block 307, a user may select to play different types of financial data extraction games provided in a financial data extraction system. A user may select and play different genres of a financial data extraction game provided. Different genres of a financial data extraction games may include, without limitation, action, adventure, casual, fighting, platform, puzzle, racing, role-playing, simulation, sports, strategy game, and shooters. In an exemplary embodiment, a financial data extraction game may enable a user to play financially-centric games and the user may be presented with different scenarios and questions in a manner described above.

In block 308, actions, responses and/or feedback from a user during play of a financial data extraction game may be captured. Information captured during play of a financial data extraction game may be associated with information associated with a user which may be temporarily stored in a database.

In block 309, the user's actions, responses and feedback captured during play of a financial data extraction game may be analyzed. A user's financial profile may be calculated based on the information captured during play of a financial data extraction game to identify how to better serve a customer. Also, the calculation may include mapping or identifying the consumer's personality based on the information captured during play of a financial data extraction game.

In an exemplary embodiment, a scenario associated with a financial data extraction game may be utilized to determine a user's financial profile including, without limitation, risk tolerance, patience, aggressiveness, competitiveness, life-style and any other information that may be utilized by a financial institution in evaluating a user's financial profile. For example, a numerical range may be associated with a user's financial profile. For example, regarding the user's risk tolerance, numeral one may be associated with low risk tolerance and numeral ten may be associated with high risk tolerance. Accordingly, depending on a user's decision within a scenario associated with a financial data extraction game, the decision made by a user may be assigned a corresponding numerical value. A user's characteristics and/or preference may be tabulated based on the numerical value assigned to a user's financial profile.

In block 310, a financial institution may utilize the determination of a user's characteristics and/or preference to identify how a user may wants to be served, user's personal analysis, and/or a potential products and/or services offered by a financial institution that may be suited for a user. For example, a search may be performed in a products and services module (e.g., products and services module 207) based on the determination of a user's characteristics and/or preference to determine potential products and/or services that may be suited for the user.

Figure 4:
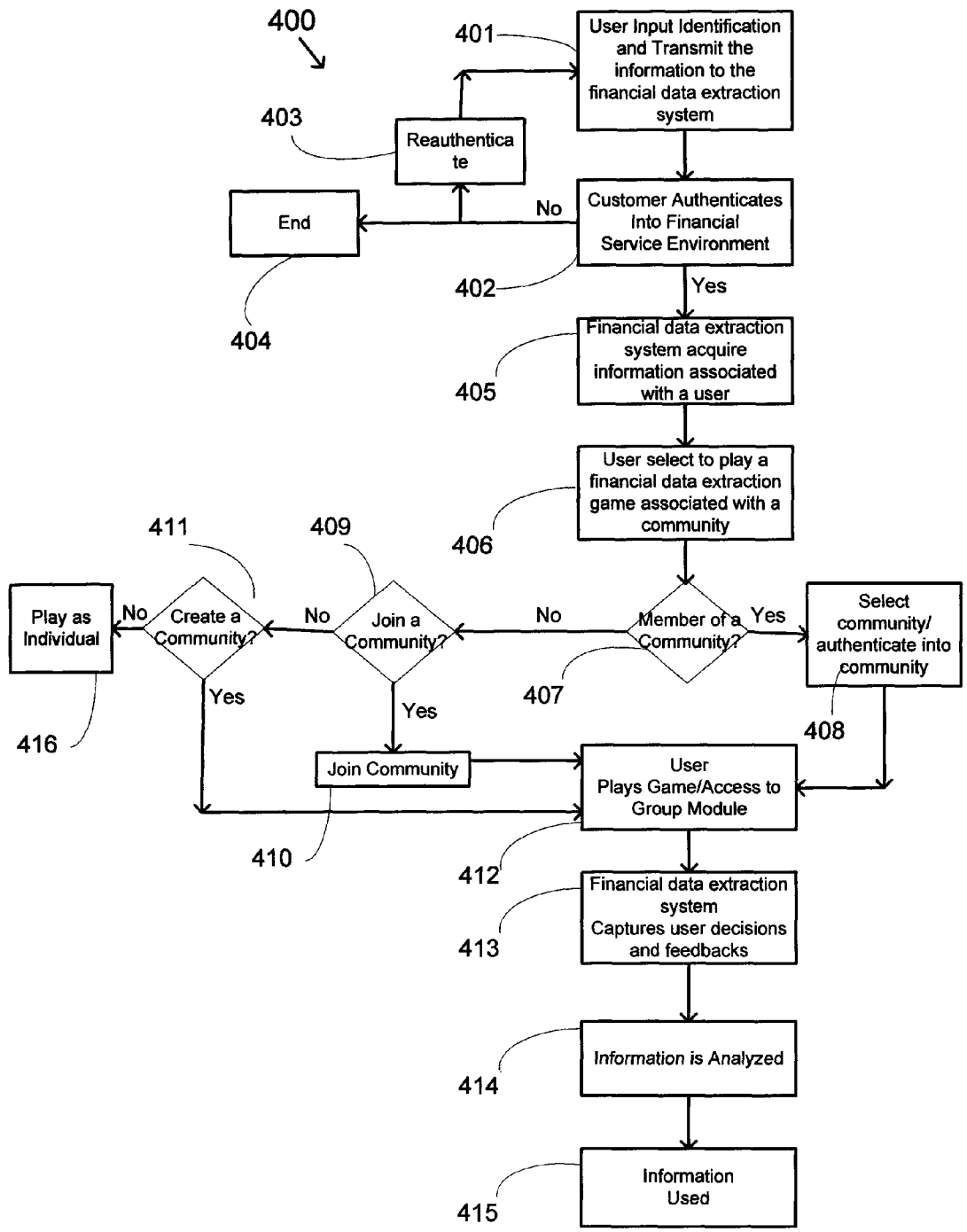
FIG. 4 depicts a flow chart illustrating a method for user data extraction according to an exemplary embodiment of the disclosure.

FIG. 4 depicts a flow chart 400 which also illustrates an exemplary method of extracting financial data from a user. FIG. 4 depicts an illustrative embodiment with blocks 401-404 operating in a similar manner as described for blocks 301-304 and blocks 413-415 operating in a similar manner as described for blocks 308-310.

In block 406, a community selection may be presented to a user when the user may be authenticated into a financial service environment. A user may select the community selection to play a financial data extraction game.

In block 407 it may be determined whether a user is a member of a community. A user may or may not be associated with a community. For example, a user may be associated with a community and the user may select the community in which the user may be associated with in block 408. Accessing a community may entail an authentication process. A user associated with a community may input user identification information associated with the community. The inputted user identification information may be compared with an established user identity associated with a community. A user may be authenticated into a community and may play a financial data extraction game in block 412.

In block 412, a game community may enable users to post and/or share strategies and any communication with other users in the game community. A user may access the game community to review list top scorers of a financial data extraction game, recommended strategies for a financial data extraction game, or any other topic communication between users. Also, a game community may be monitored by a financial institution in order to ensure that any offensive or obscene material is not posted in a forum creating by a user and/or further gather more detailed information regarding a user.

In block 412, teams may also be formed within a community to play a competing financial data extraction game. Further, communities may compete against each other in a financial data extraction game. Furthermore, instant communication between users, teams, or communities may be enabled during play of a financial data extraction game.

In an exemplary embodiment, a user may not be associated with a community and may join a game community in block 409. A user may select a community and may join the community. In block 410, a community may enable a user to join by broad acceptance or by conditional entry. For example, a community may enable a user to join by broad acceptance and thus the user may join the community automatically without condition. Also, a community may enable a user to join by conditional acceptance. A user associated with a community may invite a user who may not have association with the community to join the community. Further, a user associated with a community may invite a new user who may not have association with a financial institution to join the community to play a financial data extraction game offered by the financial institution. A user may join a community and playing a financial data extraction game in block 412.

In an exemplary embodiment, a user may not be associated with a community and may not join a community. A user may create a community in block 411. In an exemplary embodiment, a creator of a community may be an administrator of the community. The creator of a community may establish parameters associated with the community. For example, parameter associated with a community may include, without limitation, broad acceptance or conditional acceptance of the community, a forum for the community, the goal or objective of the community or any other parameters that may be associated with a community. A user may create a community and may enable other user to join the community to play a financial data extraction game in block 412. A user may also play as an individual player in a financial data extraction game in block 416.

Figure 5:
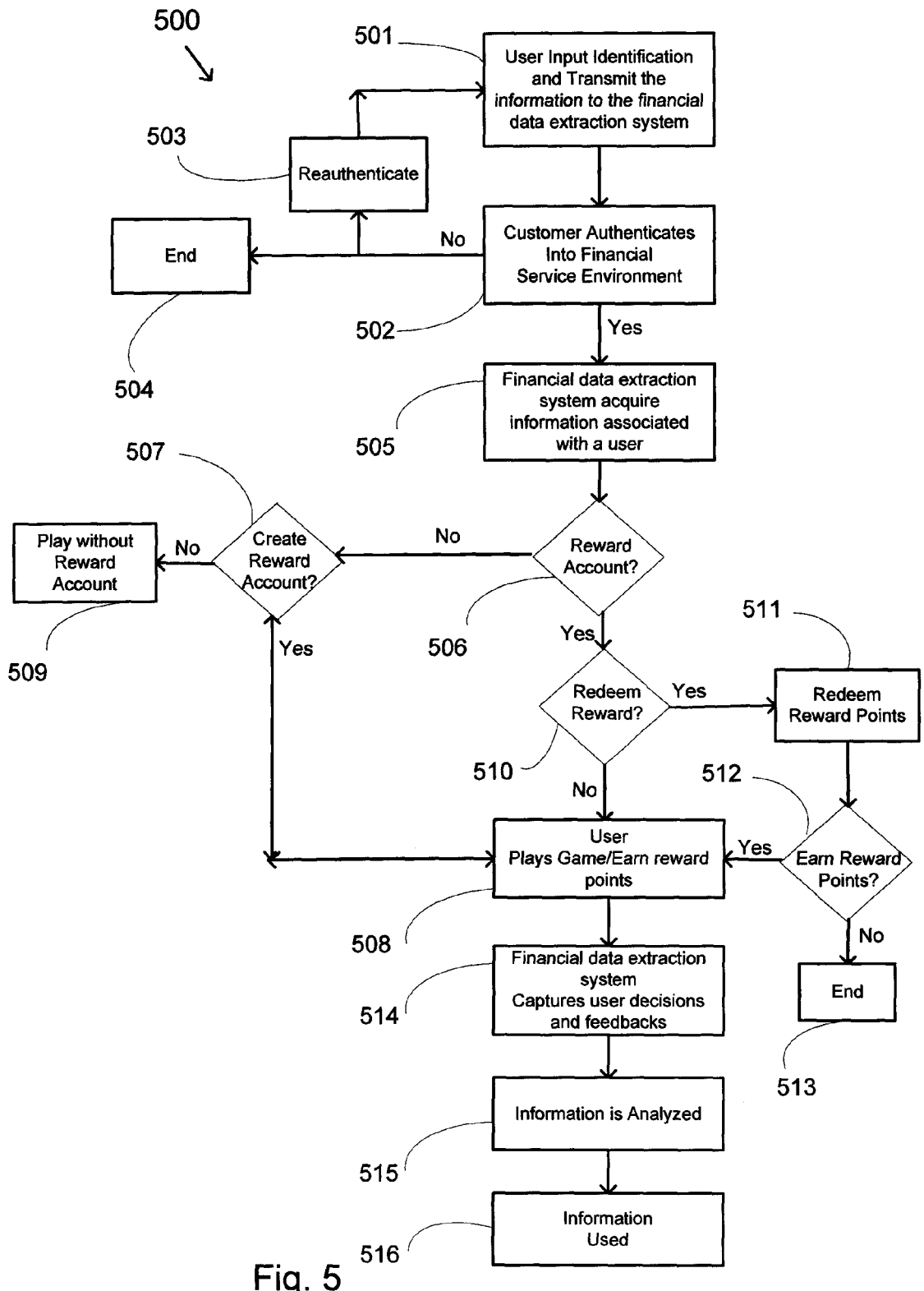
FIG. 5 depicts a flow chart illustrating a method for user data extraction according to an exemplary embodiment of the disclosure.

FIG. 5 depicts a flow chart 500 which illustrates an exemplary method of extracting financial data from a user. FIG. 5 depicts an illustrative embodiment with blocks 501-505 operating in a similar manner as described for blocks 301-305 and blocks 514-516 operating in similar manner as described for blocks 308-310.

In block 506, a reward selection may be presented to a user when the user may be authenticated into a financial service environment. A user may select the reward selection to earn reward points that may be redeemed on products and/or services offered by a financial institution. If a user may be associated with a reward account, the user may proceed to play a financial data extraction game and earn reward in block 508.

Also, a user may not be associated with a reward account, and the user may select to create a reward account in block 507. A user who may not be associated with a reward account may input any information that may be required by a financial institution via the user system. Information may be required by a financial institution to create a reward account may include, without limitation, user's name, password, address, telephone number, cellular telephone number, e-mail address, products and/or services associated with the user, a community that may be associated with a user and any other information may be required to create a reward account. A reward account may store reward information and reward points associated with a user. Also, a reward account may be associated with established user identity and may enable a user to access the reward account once authenticated into a financial service environment. A user may also decline to create a reward account and play a financial data extraction game in block 509.

In block 508, reward points may be awarded to engender incentive for a user to play a financial data extraction game. Various methods may be provided for a user to earn reward points. For example, an existing user of a financial data extraction game may invite a new user to play the financial data extraction game. Also, reward points may be awarded when a user achieve a level or score in a financial data extraction game. Further, reward points may be awarded to a winner of a competing financial data extraction game. Furthermore, other methods of earning reward points from a financial data extraction game may include, without limitation, the time spent playing a financial data extraction game, advancement of levels in a financial extraction game, number of different financial data extraction games played by a user, top scorers for a financial data extraction game and inviting player who may not have established association with a financial institution to join a financial data extraction game. Reward points earned by a user may be stored in the user's reward account.

In block 510, a user may review the reward account associated with the user and a user may redeem any reward points earned on products and/or services offered by a financial institution or gifts offered by a financial institution and/or cash back. A user may redeem rewards pointed earned on products and/or services offered by a financial institution or gifts offered by a financial institution and/or cash back in block 511. A user may also earn reward points or exit a financial service environment in block 512. A user may earn reward points by playing financial data extraction game in block 508. A user may exit the financial service environment in block 513.

In an exemplary embodiment, a user may obtain access to a financial service environment via a mobile storage device associated with a financial institution. Access to financial service environment may be obtained by a mobile storage device associated with a financial institution by employing a similar process and system as mentioned above, except a game module may be installed on a user system by a mobile storage device associated with a financial institution.

The financial data extraction system may include, without limitation, modules associated with a financial institution as shown and described in FIG. 2. A user may install a game module stored on a mobile storage device associated with a financial institution onto a user system. The game module may create a link or an icon or any other graphical representation on a user system when a game module is installed onto the user system. A link or an icon may be activated (e.g., clicked on) by a user to initiate a financial data extraction process. A user may input user identification information via an interface of a user system. The user identification information may be securely transmitted over a network (e.g., network 102) to a financial data extraction system (e.g., financial data extraction system 103). The user identification information may be received by an authentication module (e.g., authentication module 201) and the authentication module may authenticate a user using the user identification. The authentication module may match user identification information with an established user identification information stored in a customer database module (e.g., customer database module 202). If user identification information matches an established user identification information stored on the customer database module, the user may be allowed access to a financial service environment.

The authentication module may search the customer database module to identify any information associated with a user. A game module (e.g., game module 203) installed on a user system may simultaneously upon receipt of a information associated with a user present the user a financial data extraction game. A game engine module (e.g., game engine module 204) may present a user different types of financial data extraction games installed on a user system to play.

Information associated with a user may be captured by the game engine module may be stored in a game database module (e.g., game database module 205). The game database module installed on a user system may match information associated with a user transferred from the authentication module with a user's actions, responses and feedback captured during a financial data extraction game by the game engine module. The matched information associated with a user with information gathered during a financial data extraction game may be sent to a analysis module (e.g., analysis module 206) by the game database module. The game database module installed on a user system may directly transfer information captured during a financial data extraction game to the financial data extraction system via the network. A user system containing the game module may not be connected to the financial data extraction system and the information captured during a financial data extraction game may be stored in the game database module and may be transferred to the financial data extraction system once the network connection may be established.

The analysis module may calculate a user's characteristics and/or preferences based on information captured during a financial data extraction game to identify how to better serve a user. The analysis module may utilize a determined user's characteristics and/or preferences to calculate how a user may be better served or to perform a search in a products and services module (e.g., products and services module 207) to determine products and/or services offered by a financial institution which may be suited for a user.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving information associated with a user;
   providing the user a game application to play via a network, the game being associated with a financial service environment;
   using a financial data extraction system, acquiring one or more responses from the user during game play, wherein the acquired one or more responses from the user during the game play represents the user's risk tolerance, spending habits, or creditworthiness;
   using the financial data extraction system, determining one or more characteristics associated; and offering a financial product or service to the user based on the one or more characteristics.

2. A method according to claim 1, further comprising:
storing the one or more responses.

3. A method according to claim 1, wherein the game comprises:
an animated video game or a simulation game.

4. A method according to claim 1, wherein the financial service environment enables game play amongst a plurality of users.

5. A method according to claim 4, further comprising:
enabling the plurality of users to compete against each other.

6. A method according to claim 5, further comprising:
enabling communication between the plurality of users.

7. A method according to claim 1, wherein the financial service environment enables a first user to invite a second user to become a user within the financial service environment.

8. A method according to claim 1, further comprising:
rewarding the user based on the user's action within the financial service environment.

9. A method according to claim 8, wherein the user's actions comprise:
actions associated with playing the game or inviting other users to become users within the financial service environment.

10. A method according to claim 8, wherein the actions associated with playing the game are associated with advancement of level or score in the game, wining the game, time spent playing the game, the number of different games played, or being the top scorer of the game.

11. A method according to claim 8, wherein the rewarding comprises:
allocating reward points to an account associated with the user.

12. A system comprising:
an authentication receiver to receive information associated with a user;
a game engine processor to provide the user a game to play and acquire one or more responses associated with the user during game play, wherein the acquired one or more responses represent the user's risk tolerance, spending habits, or creditworthiness;
a game database for storing the one or more responses acquired during game play in the financial service environment;
an analysis module to determine one or more characteristics associated with the user based on the one or more acquired responses; and
an offer module for offering a financial product or service to the user based on the one or more characteristics.

13. A system according to claim 12, wherein the game database stores the game provided to the user in the financial service environment.

14. A system according to claim 13, wherein the game stored in the game database comprises:
an animated video game or a simulation game.

15. A system according to claim 12, further comprising:
a group module to enable game play amongst a plurality of users.

16. A system according to claim 15, wherein the group module further comprises an invitation module to enable a first user to invite a second user to become a user within the financial service environment.

17. A system according to claim 15, wherein the group modules further comprises a conference module to enable communication between the plurality of users.

18. A system according to claim 12, further comprises a reward module to reward the user based on the user's action within the financial service environment.

19. A system according to claim 18, wherein the reward module allocates reward points to an account associated with the user.

20. A non-transitory computer-accessible medium encoded with computer program code effective to perform the following:
receive information associated with a user;
provide the user a game to play and acquire one or more responses associated with the user during game play, wherein the acquired one or more responses represent the user's risk tolerance, spending habits, or creditworthiness;
store the one or more responses acquired during game play in the financial service environment;
determine one or more characteristics associated with the user based on the one or more acquired responses; and
offer a financial product or service to the user based on the one or more characteristics.

21. A computer-accessible medium according to claim 20, further comprising computer program code effective to:
enable game play amongst a plurality of users.

22. A computer-accessible medium according to claim 20, further comprising computer program code effective to:
provide the user an incentive system in the financial service environment.

* * * * *